US009880908B2

(12) United States Patent
Jeansonne et al.

(10) Patent No.: US 9,880,908 B2
(45) Date of Patent: Jan. 30, 2018

(54) RECOVERING FROM COMPROMISED SYSTEM BOOT CODE

(71) Applicant: HEWLETT-PACKARD DEVELOPMENT COMPANY, L.P., Houston, TX (US)

(72) Inventors: Jeffrey Kevin Jeansonne, Houston, TX (US); Valiuddin Y Ali, Houston, TX (US); Lan Wang, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 40 days.

(21) Appl. No.: 14/780,967

(22) PCT Filed: Apr. 23, 2013

(86) PCT No.: PCT/US2013/037724
§ 371 (c)(1),
(2) Date: Sep. 28, 2015

(87) PCT Pub. No.: WO2014/175861
PCT Pub. Date: Oct. 30, 2014

(65) Prior Publication Data
US 2016/0055068 A1 Feb. 25, 2016

(51) Int. Cl.
*G06F 11/00* (2006.01)
*G06F 11/14* (2006.01)
(Continued)

(52) U.S. Cl.
CPC ........ *G06F 11/1469* (2013.01); *G06F 3/0619* (2013.01); *G06F 3/0629* (2013.01);
(Continued)

(58) Field of Classification Search
CPC .............. G06F 21/575; G06F 11/1666; G06F 11/2094; G06F 8/66; G06F 9/4408
See application file for complete search history.

(56) References Cited

U.S. PATENT DOCUMENTS 5,469,573 A * 11/1995 McGill, III ......... G06F 11/1469
707/999.2
5,564,054 A * 10/1996 Bramnick ............. G06F 9/4411
713/2
(Continued)

FOREIGN PATENT DOCUMENTS

| CN | 1799028 | 7/2006 |
|---|---|---|
| CN | 1928843 | 3/2007 |

(Continued)

OTHER PUBLICATIONS

U.S. Appl. No. 14/780,892, Non-Final Office Action dated Jun. 16, 2017, pp. 1-23.
(Continued)

*Primary Examiner* — Loan L. T. Truong
(74) *Attorney, Agent, or Firm* — Trop, Pruner & Hu P.C.

(57) ABSTRACT

In a state of a system in which a processor of the system is not accessing a first memory, a controller in the system determines whether system boot code from the first memory in the system is compromised, wherein the first memory is accessible by the processor and the controller over a bus. In response to determining that the system boot code is compromised, the controller retrieves system boot code from a second memory in the computing device to replace the system boot code in the first memory, where the second memory is electrically isolated from the bus and is inaccessible by the processor.

17 Claims, 4 Drawing Sheets

(51) Int. Cl.
    *G06F 21/57*           (2013.01)
    *G06F 3/06*            (2006.01)

(52) U.S. Cl.
    CPC .......... *G06F 3/0683* (2013.01); *G06F 21/572* (2013.01); *G06F 2201/84* (2013.01)

(56) References Cited

U.S. PATENT DOCUMENTS

| | | | | |
|---|---|---|---|---|
| 5,713,024 | A * | 1/1998 | Halladay | G06F 11/1438 714/13 |
| 5,745,669 | A * | 4/1998 | Hugard | G06F 11/1417 714/3 |
| 5,778,070 | A | 7/1998 | Mattison | |
| 5,828,888 | A * | 10/1998 | Kozaki | G06F 9/4416 713/2 |
| 5,918,047 | A * | 6/1999 | Leavitt | G06F 11/1417 713/2 |
| 5,987,605 | A * | 11/1999 | Hill | G06F 9/441 713/100 |
| 6,205,527 | B1 * | 3/2001 | Goshey | G06F 11/1458 711/162 |
| 6,275,930 | B1 * | 8/2001 | Bonamico | G06F 11/1417 713/1 |
| 6,539,473 | B1 * | 3/2003 | Hubacher | G06F 9/4416 709/203 |
| 6,651,188 | B2 * | 11/2003 | Harding | G06F 11/1417 714/38.13 |
| 7,069,445 | B2 * | 6/2006 | Cheston | G06F 21/575 711/163 |
| 7,383,431 | B2 * | 6/2008 | Takamizawa | G06F 8/65 713/2 |
| 7,409,539 | B2 * | 8/2008 | Arnez | G06F 11/1417 713/1 |
| 7,613,872 | B2 | 11/2009 | Dayan et al. | |
| 7,734,945 | B1 * | 6/2010 | Levidow | G06F 11/079 714/3 |
| 7,818,622 | B2 * | 10/2010 | Burks, III | G06F 11/0748 713/2 |
| 7,900,091 | B2 | 3/2011 | Chou et al. | |
| 7,908,470 | B1 | 3/2011 | Cavanna | |
| 8,392,762 | B2 * | 3/2013 | Aralakuppe Ramegowda | G06F 11/1004 713/1 |
| 8,429,391 | B2 * | 4/2013 | Galbo | G06F 9/4401 711/173 |
| 8,489,922 | B2 * | 7/2013 | Matthew | G06F 9/4416 714/15 |
| 9,411,688 | B1 * | 8/2016 | Poolla | G06F 11/1417 |
| 9,417,967 | B2 * | 8/2016 | Huang | G06F 11/1435 |
| 9,542,195 | B1 * | 1/2017 | Astarabadi | G06F 9/4411 |
| 9,575,768 | B1 * | 2/2017 | Kim | G06F 9/4401 |
| 2001/0008011 | A1 * | 7/2001 | Oba | G06F 8/60 713/2 |
| 2002/0002652 | A1 * | 1/2002 | Takahashi | G06F 8/60 711/103 |
| 2003/0126511 | A1 * | 7/2003 | Yang | G06F 9/4401 714/39 |
| 2003/0221114 | A1 | 11/2003 | Hino | |
| 2004/0025002 | A1 * | 2/2004 | Cepulis | G06F 11/1417 713/2 |
| 2004/0030877 | A1 | 2/2004 | Frid | |
| 2004/0076043 | A1 | 4/2004 | Boals et al. | |
| 2004/0133790 | A1 * | 7/2004 | Hensley | G06F 21/6209 713/191 |
| 2004/0193862 | A1 * | 9/2004 | Lin | G06F 11/1456 713/1 |
| 2005/0108564 | A1 | 5/2005 | Freeman | |
| 2005/0190699 | A1 | 9/2005 | Smith | |
| 2005/0251673 | A1 * | 11/2005 | Bosley | G06F 11/1433 713/2 |
| 2005/0273588 | A1 * | 12/2005 | Ong | G06F 11/1417 713/2 |
| 2006/0075395 | A1 * | 4/2006 | Lee | G11C 16/102 717/168 |
| 2006/0161784 | A1 | 7/2006 | Hunter | |
| 2006/0225067 | A1 * | 10/2006 | Yang | G06F 8/65 717/168 |
| 2007/0260866 | A1 | 11/2007 | Wang | |
| 2008/0040596 | A1 * | 2/2008 | Mai | G06F 9/4403 713/2 |
| 2008/0086631 | A1 * | 4/2008 | Chow | G06F 8/665 713/2 |
| 2008/0098381 | A1 * | 4/2008 | Lin | G06F 8/65 717/168 |
| 2008/0126782 | A1 | 5/2008 | Dayan | |
| 2008/0141016 | A1 * | 6/2008 | Chang | G06F 11/1433 713/2 |
| 2008/0172558 | A1 * | 7/2008 | Stakutis | G06F 11/1417 713/2 |
| 2008/0195750 | A1 * | 8/2008 | Sadovsky | G06F 21/78 709/234 |
| 2008/0209553 | A1 * | 8/2008 | Lu | G06F 12/1433 726/22 |
| 2008/0269954 | A1 | 10/2008 | Lev | |
| 2009/0063834 | A1 * | 3/2009 | Huang | G06F 9/4401 713/2 |
| 2009/0089570 | A1 * | 4/2009 | Andrianov | G06F 9/4401 713/2 |
| 2009/0100287 | A1 * | 4/2009 | Chu | G06F 11/0769 714/2 |
| 2009/0158024 | A1 * | 6/2009 | Hung | G06F 11/1666 713/2 |
| 2009/0249113 | A1 * | 10/2009 | Chou | G06F 11/0793 714/2 |
| 2009/0271602 | A1 * | 10/2009 | Burks, III | G06F 11/0748 713/2 |
| 2009/0327684 | A1 | 12/2009 | Zimmer | |
| 2010/0017589 | A1 * | 1/2010 | Reed | G06F 11/1417 713/2 |
| 2010/0064127 | A1 * | 3/2010 | Lee | G06F 11/1417 713/2 |
| 2010/0082960 | A1 | 4/2010 | Grobman | |
| 2010/0100720 | A1 * | 4/2010 | Wu | G06F 11/1417 713/2 |
| 2010/0235617 | A1 * | 9/2010 | Chen | G06F 11/1417 713/2 |
| 2010/0299493 | A1 | 11/2010 | McGee, III | |
| 2010/0299560 | A1 | 11/2010 | Lin | |
| 2011/0066837 | A1 * | 3/2011 | Lee | G06F 9/4401 713/2 |
| 2011/0093741 | A1 * | 4/2011 | Liang | G06F 11/1417 714/6.1 |
| 2012/0011393 | A1 * | 1/2012 | Roberts | G06F 11/1417 714/6.3 |
| 2012/0072710 | A1 * | 3/2012 | Gupta | G06F 9/4405 713/2 |
| 2012/0072897 | A1 * | 3/2012 | Selvam | G06F 8/66 717/171 |
| 2012/0210165 | A1 | 8/2012 | Lambert et al. | |
| 2013/0047031 | A1 | 2/2013 | Tabone et al. | |
| 2013/0159690 | A1 | 6/2013 | Tsukamoto | |
| 2013/0232325 | A1 * | 9/2013 | Jang | G06F 11/1417 713/2 |
| 2014/0115314 | A1 | 4/2014 | Huang | |
| 2014/0237223 | A1 * | 8/2014 | Chudgar | G06F 9/4416 713/2 |
| 2014/0281455 | A1 * | 9/2014 | Kochar | G06F 9/4401 713/2 |
| 2015/0095632 | A1 * | 4/2015 | Huang | G06F 11/1417 713/2 |
| 2015/0242656 | A1 | 8/2015 | Dasari | |
| 2015/0301880 | A1 * | 10/2015 | Allu | G06F 11/0709 714/4.3 |
| 2015/0324588 | A1 * | 11/2015 | Locke | G06F 21/562 713/2 |
| 2016/0055113 | A1 * | 2/2016 | Hodge | G06F 21/575 710/308 |

(56) References Cited

U.S. PATENT DOCUMENTS

2016/0063255 A1* 3/2016 Jeansonne ............. G06F 9/4401
       713/2
2016/0364570 A1* 12/2016 Stern ..................... G06F 21/575
2017/0249002 A1* 8/2017 Costa .................... G06F 1/3206

FOREIGN PATENT DOCUMENTS

CN       101894054        11/2010
WO    WO-2010135485       11/2010

OTHER PUBLICATIONS

Hodge et al., International Application No. PCT/US13/37725 entitled Redundant System Boot Code in a Secondary Non-Volatile Memory filed Apr. 23, 2013 (25 pages).

Jeansonne et al., International Application No. PCT/US13/37727 entitled Configuring a System filed Apr. 23, 2013 (35 pages).

Jeansonne et at, International Application No. PCT/US13/37728 entitled Event Data Structure to Store Event Data filed Apr. 23, 2013 (36 pages).

Jeansonne. et al., International Application No. PCT/US13/37729 entitled Repairing Compromised System Data in a Non-Volatile Memory filed Apr. 23, 2013 (25 pages).

Jeansonne et al., International Application No. PCT/US13/37733 entitled Retrieving System Boot Code From a Non-Volatile Memory filed Apr. 23, 2013 (26 pages).

Jeansonne et al., International Application No. PCT/US13/37735 entitled Verifying Controller Code and System Boot Code filed Apr. 23, 2013 (36 pages).

Regenscheid; "BIOS Integrity Measurement Guidelines (Draft)", <http://csrc.nist.gov/publications/drafts/800-155/draft-SP800-155_Dec2011.pdf>, Dec. 2011.

* cited by examiner

RECOVERING FROM COMPROMISED SYSTEM BOOT CODE

BACKGROUND

A computing system can include code to perform various startup functions of the computing system. This code can include Basic Input/Output System (BIOS) code. BIOS code can be the subject of attacks by malware in the computing system or from an external service. As a result of an attack, the BIOS code can become compromised.

BRIEF DESCRIPTION OF THE DRAWINGS

Some implementations are described with respect to the following figures.

DETAILED DESCRIPTION

Figure 1:
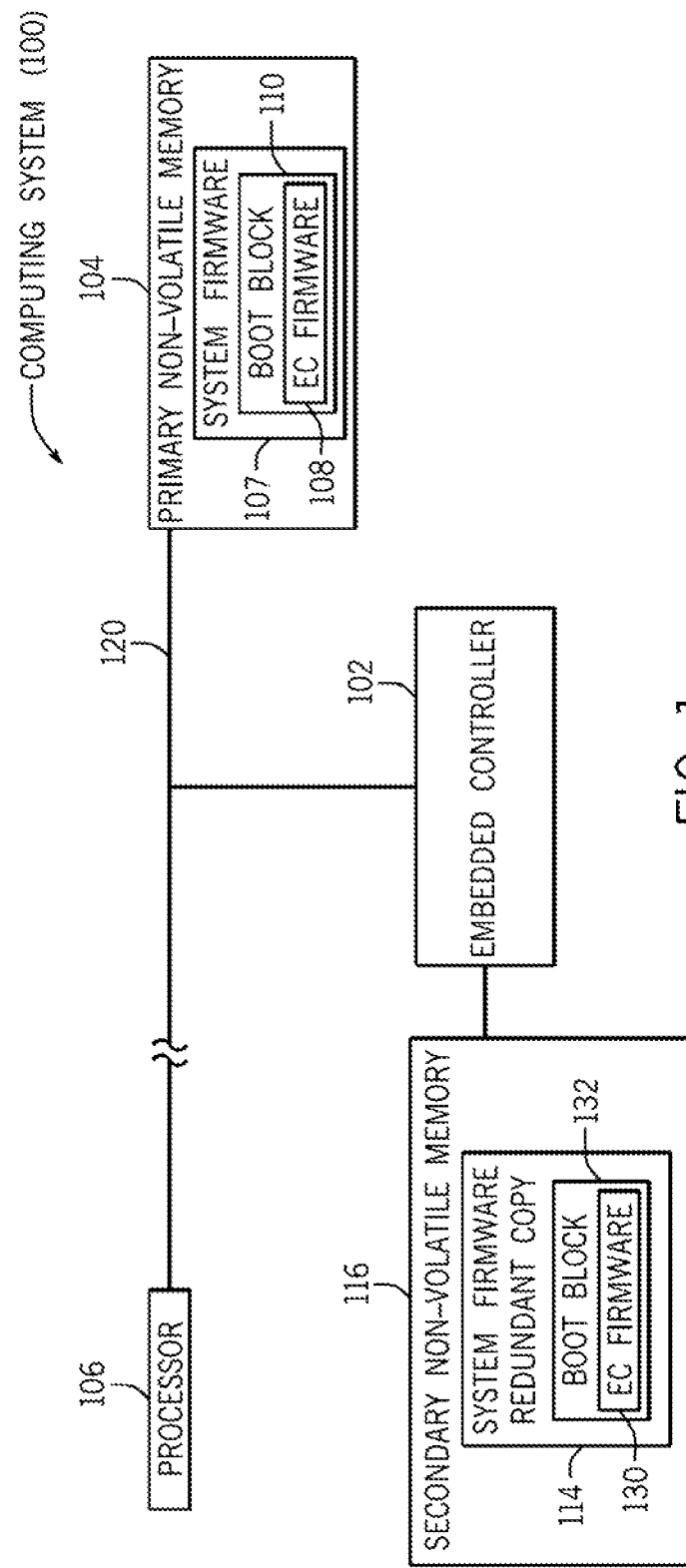
FIG. 1 is a block diagram of an example system according to some implementations.

Malware attacks on system code used to perform startup of a computing system can cause the integrity of the computing system to be compromised such that unauthorized access and operations in the computing system can occur. For example, compromised system code can allow covert remote monitoring and/or control of the computing system by a malicious entity, unauthorized access and/or modification of data in the computing system by malware, disablement of the computing system, and so forth. Compromised system code can refer to system code that has been corrupted such that the system code is no longer usable, or alternatively, compromised system code can refer to system code that has been changed in some way but that is still able to execute. Note that system code can also be compromised accidentally or intentionally.

Although a protection mechanism can be provided in a computing system to protect the system code, such protection mechanism may become compromised under certain conditions, which can subject the system code to malware attacks.

System code used to perform startup of a computing system can include system firmware, which can be in the form of machine-readable instructions executable on a processor (or processors) of the computing system. "System firmware" can cover any machine-readable instructions that are able to perform startup of a computing system. Examples of computing systems include desktop computers, notebook computers, tablet computers, personal digital assistants (PDAs), smartphones, game appliances, server computers, storage nodes, network communication nodes, and so forth.

System firmware can include Basic Input/Output System (BIOS) code, which can initialize various components of the computing system, and load an operating system (OS) of the computing system. The BIOS code can perform checking of hardware components to ensure that the hardware components are present and functioning properly. This can be part of a power-on self-test (POST) procedure, for example. After the POST procedure, the BIOS code can progress through the remainder of a booting sequence, after which the BIOS code can load and pass control to the OS. BIOS code can include legacy BIOS code or Unified Extensible Firmware Interface (UEFI) code. In some examples, the BIOS code can include a runtime portion that is executed after the OS loads.

The system firmware can be stored in non-volatile memory, such as a flash memory or any other persistent memory that is programmable. Once system firmware in a non-volatile memory is compromised, one possible remediation may involve physically replacing a component that includes the non-volatile memory. Such a technique of addressing compromised system firmware can be labor-intensive, costly, and time-consuming.

Alternatively, other techniques may attempt to replace the compromised system firmware in the non-volatile memory with a valid copy of system firmware from external storage device, such as a removable storage device (e.g. Universal Serial Bus or USB storage device or other type of removable storage device). However, an external storage device containing a valid system firmware may not be available when recovery from system firmware compromise is to occur. Additionally, the policy of an enterprise (e.g. business concern, government agency, educational organization, etc.) may prohibit a recovery technique that involves use of system firmware on an external storage device.

In accordance with some implementations, in addition to providing a primary non-volatile memory that stores the system firmware that is executed by a processor of the computing system if the system firmware is not compromised, a secondary non-volatile memory is also provided that stores a "golden copy" of the system firmware. A golden copy of the system firmware refers to system firmware that is confirmed or is trusted to be valid. For example, the golden copy of the system firmware may be the original copy of the system firmware provided at the factory at the time of manufacture of the computing system. Alternatively, the golden copy of the system firmware can be a copy in the secondary non-volatile memory that has been updated in a secure manner. More generally, instead of referring to a golden copy of system firmware, a redundant copy of the system firmware can be stored in the secondary non-volatile memory.

The secondary non-volatile memory is isolated from the processor of the system to provide enhanced security, since malware running on the processor would not be able to compromise the redundant copy of the system firmware in the secondary non-volatile memory. More specifically, the secondary non-volatile memory is isolated from a bus that can be used by the processor and other entities to access the primary non-volatile memory. In accordance with some implementations, an embedded controller can be used to perform restoration of compromised system firmware, by using the redundant copy of the system firmware in the secondary non-volatile memory to replace the compromised system firmware in the primary non-volatile memory. Using the embedded controller to perform system firmware restoration reduces the likelihood of system corruption during the system firmware restoration process.

In the present discussion, although reference is made to "system firmware," it is noted that techniques or mechanisms can be applied to other types of system boot code, where system boot code can refer to any code that can boot a computing system after restart the computing system or can resume the computing system from a low power state.

FIG. 1 is a block diagram of an example computing system 100 that includes an embedded controller 102, a primary non-volatile memory 104, a processor 106, and a secondary non-volatile memory 116. The primary non-volatile memory 104 is a shared non-volatile memory that it is accessible by multiple entities, including the embedded controller 102 and at least one other entity (including the processor 106). The secondary non-volatile memory 116 is accessible by the embedded controller 102, but is inaccessible to the processor 106 or to other components in the computing system 100 (effectively, the secondary non-volatile memory 116 is electrically isolated from entities other than the embedded controller 102). Making the secondary non-volatile memory 116 inaccessible to the processor 106 and other components protects the content of the secondary non-volatile memory 116 from unauthorized tampering. The secondary non-volatile memory 116 can be accessible by the embedded controller 102 at all times.

Although not shown in FIG. 1, an input/output (I/O) controller may be provided between the processor 106 and the primary non-volatile memory 104.

The secondary non-volatile memory 116 can be physically separate from the primary non-volatile memory 104 (such as implemented in different physical memory devices). Alternatively, the secondary non-volatile memory 116 and the primary non-volatile memory 104 can physically reside on a common memory device, but the primary non-volatile memory 104 and the secondary non-volatile memory 116 are in different segments of the physical memory device, where the segment of the physical memory device that contains the secondary non-volatile memory 116 is accessible by only the embedded controller 102. In other words, the segment that contains the secondary non-volatile memory 116 is under exclusive control of the embedded controller 102, and this segment is locked from access by the processor 106 or another entity.

The primary non-volatile memory 104 is accessible over a shared bus 120 by the embedded controller 102 or by another entity. In some implementations, just one entity can have access to the shared bus 120 at any given time, such that just one entity can access the primary non-volatile memory 104 at a time. In some examples, the shared bus 120 is a shared Serial Peripheral Interface (SPI) bus. An SPI bus is a synchronous serial data link in which devices on the SPI bus operate in a master-slave mode. In other examples, another type of shared bus 120 can be used. In alternative examples, an arbitration mechanism can be provided to allow for shared access of the bus 120 in various states of the computing system, including a low power state and a normal runtime state.

The primary non-volatile memory 104 can store system firmware 107, which can include BIOS code. The BIOS code 107 can include controller code 108 that is for execution by the embedded controller 102, and a boot block 110 that is to be executed by the processor 106. The controller code 108 can be in the form of embedded controller (EC) firmware, which can refer to any machine-readable instructions executable in the embedded controller 102. Alternatively, the controller code 108 can be application software that can be in the form of machine-readable instructions. In the ensuing discussion, although reference is made to "EC firmware," it is noted that techniques or mechanisms can be applied to other forms of the controller code 108.

In examples according to FIG. 1, the EC firmware 108 is included in the boot block 110 of the system firmware 107. Including the EC firmware 108 inside the boot block 110 can provide an indication that the EC firmware 108 has been signed by the entity that provided the system firmware 107, which can be the vendor of the computing system 100, or another entity. In other examples, the EC firmware 108 can be separate from the boot block 110.

The boot block 110 is a part of the BIOS code, and is first executed when the computing system 100 starts up. The boot block 110 is executed first before the rest of the BIOS code is allowed to execute on the processor 106. The boot block 110 can be used to check the integrity of the BIOS code as well as to perform other initial functions. If the boot block 110 confirms the integrity of the BIOS code, then the boot block 110 can pass control to the main portion of the BIOS code for initiating the remaining operations associated with the BIOS code.

In some implementations, the boot block 110 can include core root of trust for measurement (CRTM) logic, which is logic specified by the Trusted Computing Group (TCG), an industry standard work group. During a power on procedure of the computing system 100, the CRTM logic can perform certain initialization tasks and can make a number of measurements that are stored for later use. The CRTM logic can then check the BIOS code before passing control to the main portion of the BIOS code. Once the BIOS code completes execution and passes control to the OS, the OS can verify the trustworthiness of the computing system 100 based on measurements taken by the CRTM logic.

The embedded controller 102 is physically separate from the processor 106 of the computing system 100. The processor 106 is used for executing the OS, application code, and other code in the system 100. The embedded controller 102, on the other hand, can be used to perform specific predefined tasks, as programmed into the EC firmware 108. Examples of tasks that can be performed by the embedded controller 102 include any one or some combination of the following: power supply control in the computing system 100 (for controlling a power supply that supplies power supply voltages to various components in the computing system 100), charging and control of a battery in the computing system 100, thermal monitoring (to monitor a temperature in the computing system 100), fan control (to control a fan in the computing system 100), and interaction with a user input device (such as performing a scan of a keyboard of the computing system 100 or interaction with a pointing device such as a mouse, touchpad, touchscreen, and so forth). The embedded controller 102 can be implemented with a microcontroller, an application-specific integrated circuit (ASIC), a programmable gate array (PGA), or any other type of programmable circuit.

The secondary non-volatile memory 116 is electrically isolated from the shared bus 120, and stores a redundant copy 114 of system firmware, where the system firmware redundant copy 114 includes a boot block 132 and an EC firmware 130. The system firmware redundant copy 114 in the secondary non-volatile memory 116 can be a duplicate of the system firmware 107 in the primary non-volatile memory 104. Alternatively, the system firmware redundant copy 114 may be a different version (later version or earlier version) than the system firmware 107.

In some implementations, the system firmware redundant copy 114 includes just the boot block 132, but does not include the main portion of the BIOS code. In other implementations, the system firmware redundant copy 114 can include the entirety of the BIOS code. A possible benefit of including an entire copy of BIOS code in the secondary non-volatile memory 116 is that the computing system 100 would not have to go to an external source (external of the computing system 100) to retrieve a portion of the BIOS code for use in recovery from compromised system firmware.

Figure 2:
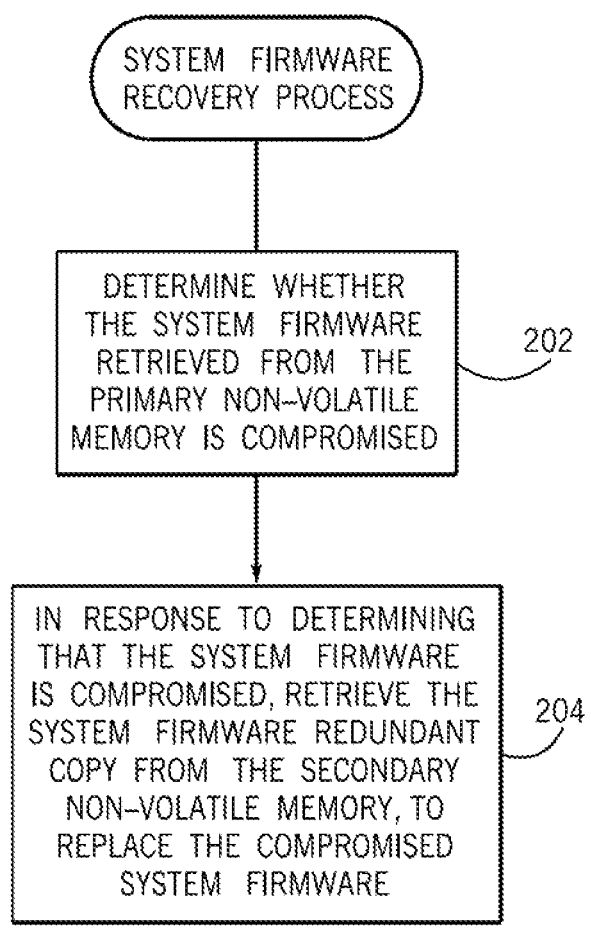
FIG. 2 is a flow diagram of a system boot code recovery process according to some implementations.

FIG. 2 is a flow diagram of a start process according to some implementations, in which system firmware 107 is to be retrieved from the primary non-volatile memory 104 for starting or resuming the computing system 100. The process of FIG. 2 can be performed by the embedded controller 102 during a time during in which the processor 106 is disabled or not accessing the primary non-volatile memory 104. The processor 106 being disabled refers to the processor 106 being in a powered off state (no power is provided to the main processing part of the processor 106) or in a reset state (e.g. a reset signal to the processor 106 is asserted that prevents the processor 106 from executing machine-readable instructions).

The embedded controller 102 determines (at 202) whether the system firmware 107 (and more specifically, the boot block 110 in some examples) retrieved from the primary non-volatile memory is compromised. This determination can be based on verifying (or performing a verification process on) the system firmware 107. Verifying a piece of code, such as the system firmware or other code, can refer to cryptographically validating that the piece of code has not been changed and/or confirming that the piece of code is from a trusted source. A technique for verifying system firmware is discussed further below in connection with FIG. 3.

In response to determining that the system firmware 107 is compromised, the embedded controller 102 retrieves (at 204) the system firmware redundant copy 114 from the secondary non-volatile memory 116 to the primary non-volatile memory 104, to replace the compromised system firmware 107.

If the system firmware 107 is verified, then the computing system 100 is ready to continue booting.

In some implementations, it is possible to update the system firmware redundant copy 114 in the secondary non-volatile memory 116, in a secure manner. The update of the system firmware redundant copy 114 can be policy-based, such as based on a policy specified in policy information, which can be stored in the secondary non-volatile memory 116, for example. Such policy-based update of the system firmware redundant copy 114 is discussed further below in connection with FIG. 4.

In further implementations, the secondary non-volatile memory 116 can store two redundant copies of system firmware. A first redundant copy of the system firmware is updateable, such as by using policy-based update. A second redundant copy of the system firmware is a non-updateable copy that is not updated after the computing system 100 leaves the factory.

In accordance with some implementations, during an initialization procedure of the embedded controller 102, the embedded controller 102 is able to verify the EC firmware (130 and/or 108) retrieved from a non-volatile memory (116 and/or 104). An initialization procedure refers to a procedure that is performed when the embedded controller 102 first starts after the embedded controller 102 has been reset or after a power cycle of the embedded controller 102 (where power is removed from and then re-applied to the embedded controller 102).

In some implementations, the embedded controller 102 can first attempt to use the EC firmware 130 in the secondary non-volatile memory 116 during a restart of the computing system 100. If the embedded controller 102 is unable to successfully use the EC firmware 130, then the embedded controller 102 can use the EC firmware 108 in the primary non-volatile memory 104 in an attempt to start the computing system 100. If the embedded controller 102 is unable to start the system using either of the EC firmware 130 or the EC firmware 108, then an error has occurred, which is likely due to compromise of both the EC firmware 130 and the EC firmware 108.

Although reference is made to first attempting to use the EC firmware 130 in the secondary non-volatile memory 116 before attempting to use the EC firmware 108 in the primary non-volatile memory 104, different implementations can first attempt to use the EC firmware 108 in the primary non-volatile memory 104 before attempting to use the EC firmware 130 in the secondary non-volatile memory 116.

In addition, once the EC firmware is verified and loaded for execution on the embedded controller 102, the EC firmware can verify (performed at 202 in FIG. 2) system firmware (e.g. system firmware 107 retrieved from the primary non-volatile memory 104) prior to each restarted execution of the system firmware by the processor 106. Restarted execution of the system firmware can occur due to a cold reset of the computing system 100, a resume from a low power state of the computing system 100, an operating system restart, and so forth. It is noted that the system firmware can also be verified by the EC firmware each time the computing system 100 enters a low power state. In other examples, the EC firmware can also verify the system firmware when the processor 106 remains powered.

In further examples, the EC firmware can perform verification of the system firmware in response to a warm reset of the computing system 100, in which a computing system 100 is restarted without removing power to the computing system 100. To allow the EC firmware to perform the verification in response to the warm reset, the computing system 100 can be forced to transition to an appropriate low power state when the warm reset is detected.

In other examples, the EC firmware can perform the verification at any time, even when the computing system is not in a low power state. For example, the EC firmware can perform the verification when the processor is idle or not accessing the shared non-volatile memory 104. The verification by the EC firmware can also be performed in "real-time," as the system firmware is retrieved for execution by the processor.

The foregoing ensures, prior to each instance of the processor 106 restarting execution of the system firmware 107, that the system firmware 107 has not been compromised.

A low power state of the computing system 100 refers to a state of the computing system 100 in which the processor 106 and certain other hardware components of the system 100 are off (e.g. no power is provided to the processor and the certain other hardware components). In the low power state, power can still be provided to the embedded controller 102. The computing system 100 can transition to a low power state in any of the following scenarios: (1) as part of a cold reset of the computing system 100 that caused the system 100 to be powered off for subsequent power on, or (2) as part of a power savings procedure, in which the computing system 100 can transition from a normal operating state to a sleep state, hibernation state, or an off state after a time period of inactivity, or in response to detecting a low battery condition, or in response to user or application command, or for another reason, or (3) in any other scenario.

Examples of low power states can include certain Advanced Configuration and Power Interface (ACPI) states, including: the ACPI S3 state (which is a form of a standby or sleep state in which the system context of the computing system 100 is maintained in volatile memory that remains powered while some components of the computing system 100 are powered off); the ACPI S4 state (which is a form of hibernation state in which the system context is saved to persistent storage to allow power to be removed from additional computing system components, including volatile memory); and the ACPI S5 state (which is a form of system off state, in which power has been removed from even more components of the computing system 100).

Figure 3:
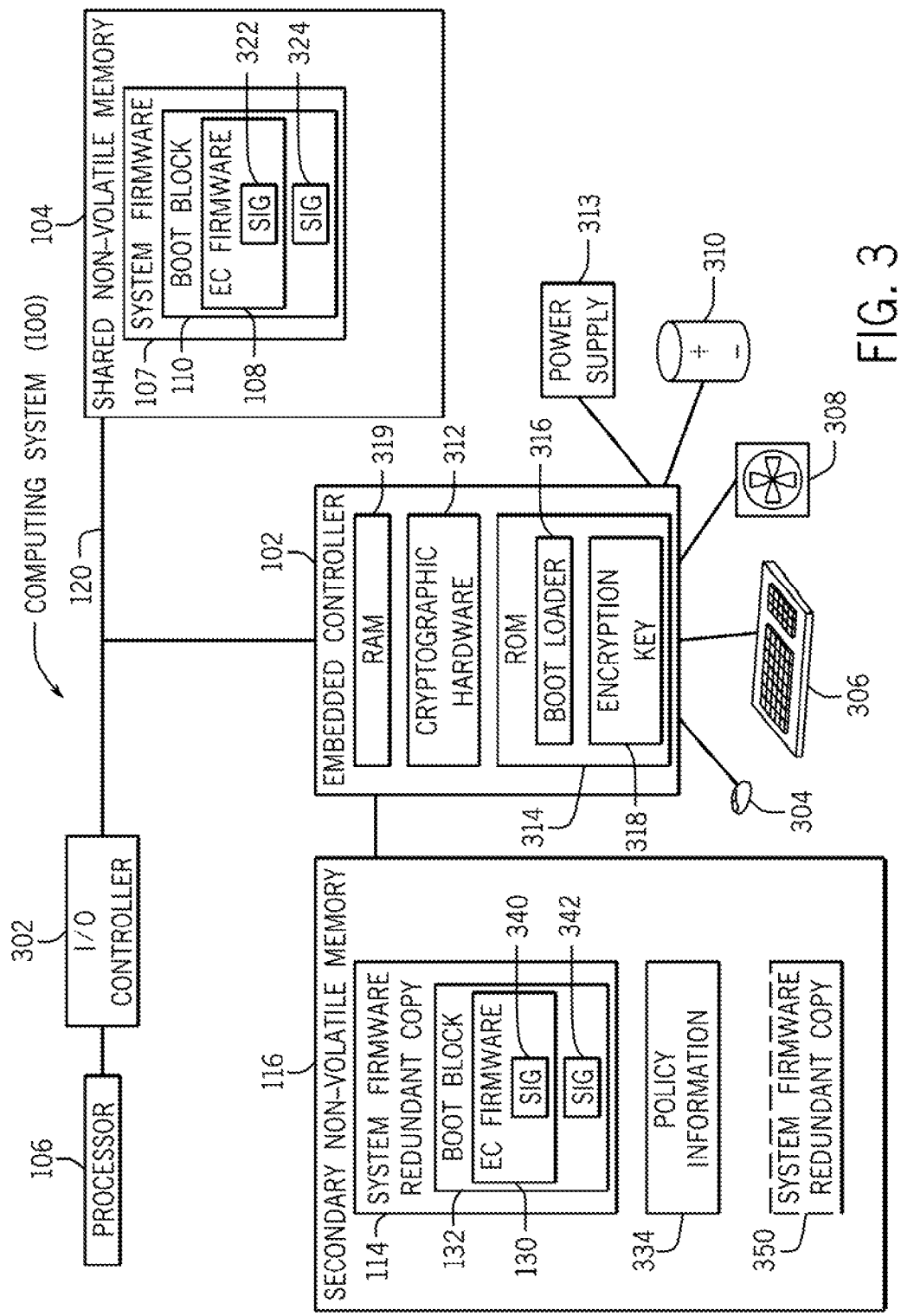
FIG. 3 is a block diagram of another example system according to further implementations.

FIG. 3 is a block diagram of the computing system 100 according to further implementations. The computing system 100 of FIG. 3 includes an input/output (I/O) controller 302, which is connected between the processor 106 and the shared bus 120. In some examples, the I/O controller 302 can be a Platform Controller Hub (PCH) from Intel Corporation. The PCH can include various functions, including a display interface to a graphics subsystem, a system bus interface to a system bus to which various I/O devices can be connected, and so forth. In other examples, other types of I/O controllers can be used.

As depicted in FIG. 3, the embedded controller 102 is coupled to a user input device 304 (e.g. a mouse device or other type of input device), a keyboard 306, a fan 308, a battery 310, and a power supply 313, to manage the respective devices (under control of the EC firmware for example).

In the FIG. 3 example, the embedded controller 102 also includes cryptographic hardware 312, which can perform cryptographic computations, such as those used in the verifying of the EC firmware and the system firmware. The cryptographic hardware 312 can be in the form of circuitry that is configured to perform cryptographic computations.

The embedded controller 102 further includes a read-only memory (ROM) 314, which can be used to store a boot loader 316 and an encryption key 318. The encryption key 318 can be the key (public key or private key) used to perform verification of the EC firmware (130 or 108). During system startup, the boot loader 316 is loaded from the ROM 314 to execute in the embedded controller 102 to retrieve EC firmware from the secondary or primary non-volatile memory 116 or 104 into a random access memory (RAM) 319 of the embedded controller 102. The boot loader 316 can take steps to ensure that no other entity except the embedded controller 102 has access to the shared bus 120 during the EC firmware load operation.

To retrieve an EC firmware for loading into the embedded controller 102, the boot loader 316 can find a pointer (or other reference) to an EC firmware image, which can be stored in the secondary or primary non-volatile memory 116 or 104.

The retrieved EC firmware is verified by the boot loader 316 that is able to invoke the cryptographic hardware 312 to assist in performing cryptographic computations.

In the primary non-volatile memory 104, a signature 322 is associated with the EC firmware 108, and a signature 324 is associated with the boot block 110. Similarly, in the secondary non-volatile memory 116, a signature 340 is associated with the EC firmware 130, and a signature 342 is associated with the boot block 132. The signature 340 or 322 is used in the verification of the respective EC firmware 108 or 130, while the signature 342 or 324 is used in the verification of the respective boot block 110 or 132. Use of a signature in the verification process can allow a determination of the authenticity of the respective EC firmware or boot block, and a determination that the respective EC firmware or boot block has not been compromised.

In some implementations, the verification of the EC firmware 108 or 130 can be accomplished by decrypting the respective signature 322 or 340 using the encryption key 318 stored in the embedded controller ROM 314. Decrypting the signature produces a respective value (e.g. hash value) that can be compared with a corresponding calculated value (e.g. hash value) of the EC firmware. If the foregoing values match, then the EC firmware is verified. A similar process can be used for verifying the BIOS boot block 110 or 132 using the respective digital signature 324 or 342.

In some examples, the secondary non-volatile memory 116 can store another system firmware redundant copy 350. In some examples, the system firmware redundant copy 114 can be updated, but the other system firmware redundant copy 350 is not updateable (immutable).

The secondary non-volatile memory 116 can also store policy information 334. For example, the policy information 334 can include information relating to one or some combination of the following policies:

a policy specifying whether an aggressive mode of operation is to be used, where aggressive mode enables verification of system firmware in every case where the host processor will execute the boot block (on each cold boot, warm boot, resume from low power state, etc.)

a policy specifying whether a manual or automated recovery mode is to be used, where a manual recovery mode involves a user action before recovery of a compromised boot block is allowed to be performed; and a policy specifying whether a locked or unlocked mode is to be used, where locked mode causes system firmware to be locked to a specific version, such as the version in the secondary non-volatile memory 116.

The policy specifying whether a locked or unlocked mode is to be used can control the policy-based update of the system firmware redundant copy 114, as explained further below.

Figure 4:
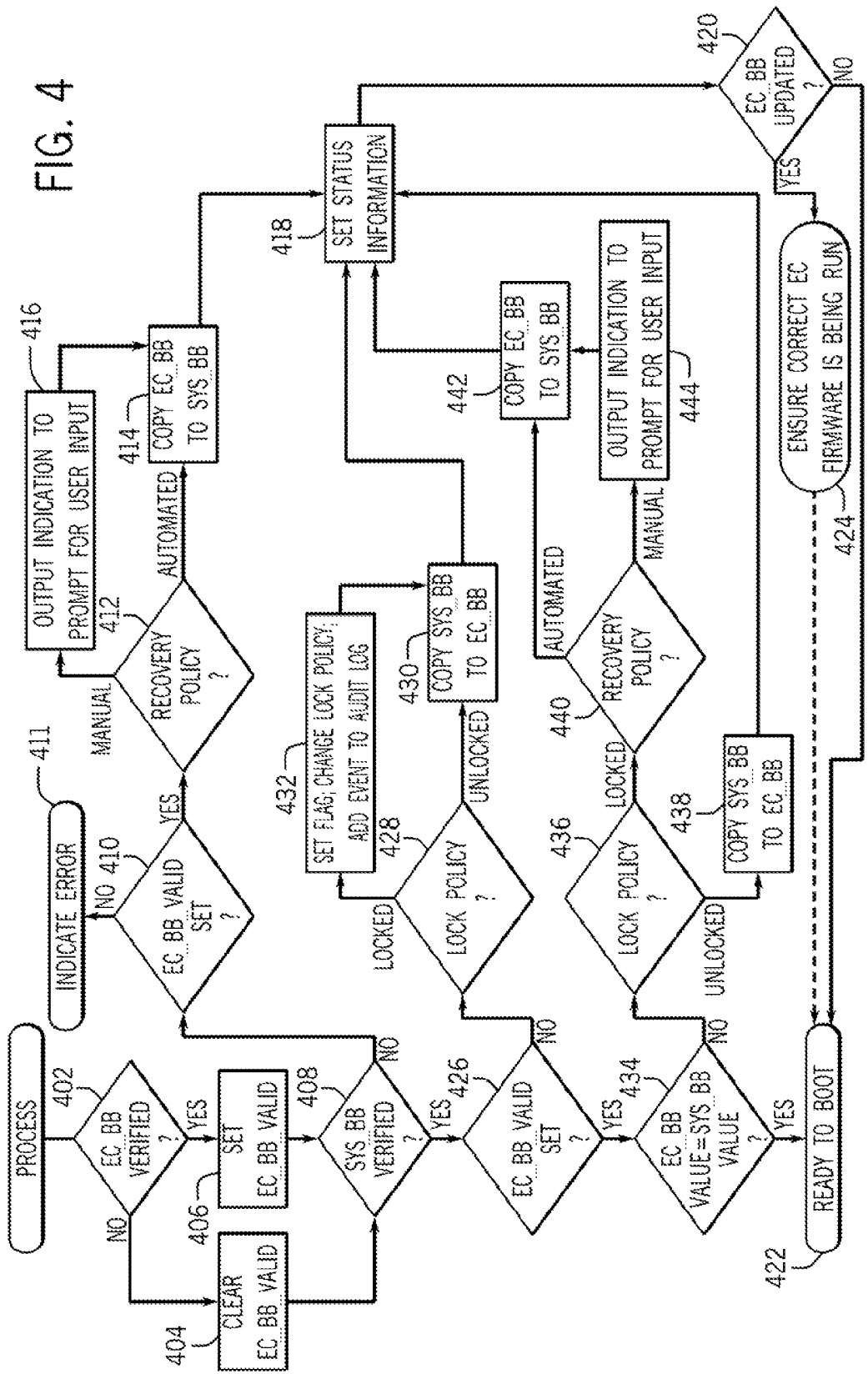
FIG. 4 is a flow diagram of a process according to further implementations.

FIG. 4 is a flow diagram of a process according to further implementations that can be performed after successful verification of the EC firmware and subsequent execution of the EC firmware on the embedded controller 102. The process of FIG. 4 can be performed by the embedded controller 102, under control of the EC firmware.

As shown in FIG. 4, the embedded controller 102 determines (at 402) whether the boot block 130 (represented as EC_BB in FIG. 4) in the secondary non-volatile memory 116 is verified (based on a verification performed using the signature 342 of FIG. 3). If not, then an EC_BB_Valid flag is cleared (at 404) to a cleared state, to indicate that the boot block 130 in the secondary non-volatile memory 116 is not verified.

However, if the determination at 402 indicates that the boot block 132 has been verified, then the EC_BB_Valid flag is set (at 406) to a set state, to indicate that the boot block 132 in the secondary non-volatile memory 116 has been verified.

Next, the EC firmware determines (at 408) whether the boot block 110 (represented as SYS_BB in FIG. 4) in the primary non-volatile memory 104 has been verified (based on a verification performed using the signature 324 of FIG. 3). If not, the EC firmware next checks (at 410) whether the EC_BB_Valid flag is set (at 410). If not, that is an indication that both the boot blocks 132 and 110 in the secondary and primary non-volatile memories 116 and 104 cannot be verified, and an error is indicated (at 411). At this point, the process of FIG. 4 stops, since the system cannot be allowed to boot due to compromised boot blocks.

If it is determined (at 410) that the EC_BB_Valid flag is set, then that is an indication that the boot block 132 in the secondary non-volatile memory 116 has been verified, even though the boot block 110 in the primary non-volatile memory 104 cannot be verified. In this case, the EC firmware determines (at 412) whether the recovery policy (stored as part of the policy information 334 in the secondary non-volatile memory 116 of FIG. 3) specifies a manual mode or an automated mode. If the automated mode is indicated, then the valid boot block 132 in the secondary non-volatile memory 116 is copied (at 414) to replace the invalid boot block 110 in the primary non-volatile memory 104. Task 414 corresponds to using the system firmware redundant copy 114 in the secondary non-volatile memory 116 of FIG. 1 to replace the compromised system firmware 107 of FIG. 1.

However, if the recovery policy specifies the manual mode, then an indication can be output (at 416) to prompt for user input, such as a key sequence or other input. Receipt of the user input causes the task 414 to be performed, where the invalid boot block 110 in the primary non-volatile memory 104 is replaced with a copy of the valid boot block 132 in the secondary non-volatile memory 116.

Next, the EC firmware sets (at 418) various status information to report actions that were taken, where the status information can be used in the next boot of the computing system.

The EC firmware next determines (at 420) whether the boot block 132 in the secondary non-volatile memory 116 has been updated. If not, then the computing system is ready to boot (422). However, if the boot block 132 in the secondary non-volatile memory 116 has been updated, then the EC firmware performs (at 424) an action to cause the computing system to check that the embedded controller 102 is running the correct version of the EC firmware, which can be accomplished by resetting the embedded controller 102, which causes the embedded controller 102 to perform its initialization procedure that includes verifying the EC firmware, after which the process of FIG. 4 is performed again.

In task 408 of FIG. 4, if the EC firmware is able to verify the boot block 110 in the primary non-volatile memory 104, then the EC firmware checks (at 426) whether the EC_BB_Valid flag is set. If not, that is an indication that the boot block 110 in the primary non-volatile memory 110 is valid, but the boot block 132 in the secondary non-volatile memory 116 is invalid. In this scenario, the EC firmware determines (at 428) whether the lock policy (as indicated in the policy information 334 of FIG. 4) specifies a locked mode or unlocked mode. If the unlocked mode is specified, that means that the boot block 132 in the secondary non-volatile memory 116 can be updated, in which case the EC firmware copies (at 430) the boot block 110 in the primary non-volatile memory 104 to the secondary non-volatile memory 116 to replace the boot block 132.

On the other hand, if it is determined (at 428) that the lock policy specifies the locked mode, then that indicates that the EC firmware is not allowed to update the boot block 132 in the secondary non-volatile memory 116. In this case, the EC firmware can set a flag (at 432) to indicate a change in the lock policy, which involves the lock policy being changed to specify the unlocked mode. Changing the lock policy from the locked mode to the unlocked mode allows the boot block 132 in the secondary non-volatile memory 116 to be replaced with the boot block 110 in the primary non-volatile memory 104 (as performed at 432). In addition, information can be added to an audit log (not shown) to indicate the foregoing event (lock policy being changed). Additionally, the user can be warned in this case that the locked policy could not be honored due to an internal error and that the user should check the lock pokey and reconfigure the platform to ensure the desired setting is configured.

Tasks 428, 430, and 432 relate to policy-based updating of the boot block 132 (or more generally the system firmware redundant copy 114) in the secondary non-volatile memory 116. In other implementations, if the lock policy determined at 428 specifies the locked mode, then the embedded controller 102 can decide to not replace the boot block 132 in the secondary non-volatile memory 116 with the boot block 110 in the primary non-volatile memory 104.

The process next proceeds to task 418.

In task 426, if it is determined that the EC_BB_Valid flag is set, that indicates that both the boot block 132 and boot block 110 have been verified. In this scenario, the EC firmware determines (at 434) whether a value (e.g. hash value, checksum value, etc.) derived based on the content of the boot block 132 is equal to a value derived based on the content of the boot block 110. If so, it is confirmed that the two boot blocks 132 and 110 are identical, and thus, the system is ready to boot (422). On the other hand, if the values derived based on the contents of the boot blocks 132 and 110 are not equal (which indicates that the boot blocks 132 and 110 are different versions), then the EC firmware determines (at 436) whether the BIOS lock policy specifies a locked mode or an unlocked mode. If the unlocked mode is specified, then the EC firmware can copy (at 438) the boot block 110 in the primary non-volatile memory 104 to the secondary non-volatile memory 116 to replace the boot block 132. The process then proceeds to task 418.

If the lock policy determined at 436 specifies the locked mode, then that is an indication that the boot block 110 in the primary non-volatile memory 104 is to be locked to the version of the boot block 132 stored in the secondary non-volatile memory 116. In some cases, the boot block 110 in the primary non-volatile memory 104 may have been updated to a newer version. However, if the lock policy specifies the locked mode, then this update of the boot block 110 in the primary non-volatile memory 104 is not allowed, in which case the boot block 110 in the primary non-volatile memory 104 is replaced with the boot block 132 in the secondary non-volatile memory 116 (by performing the copying at 442). Prior to copying (at 442) the boot block 132 to replace the boot block 110, the EC firmware can check (at 440) whether the recovery policy specifies an automated mode or a manual mode. If the automated mode is specified, then the copying at 442 can be performed directly. However, if the manual mode is specified, then the EC firmware can provide at 444) an output to prompt for user input, after which the copying at 442 can be performed.

The process then proceeds to task 418.

Tasks 434, 436, 440, 442, and 444 also relate to policy-based updating of the boot block 132 (or more generally the system firmware redundant copy 114) in the secondary non-volatile memory 116.

By using techniques or mechanisms according to some implementations, more efficient and secure recovery from compromised system firmware can be achieved. The recovery from compromised system firmware does not rely on execution of code on a processor; instead; the recovery is performed by an embedded controller. In some implementations, a secure way of updating a system firmware redundant copy can be provided. Policy-based updating of the system firmware redundant copy can provide flexibility in performing updates.

Machine-readable instructions of various modules described above are loaded for execution on a processing circuit (e.g. embedded controller 102 or processor 106). A processing circuit can include a microprocessor, microcontroller, processor module or subsystem, programmable integrated circuit, programmable gate array, or another control or computing device.

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A computing device comprising:
    a processor;
    an embedded controller;
    a first memory storing system boot code, wherein the first memory is accessible by both the processor and the embedded controller over a bus;
    a second memory electrically isolated from the bus and storing a system boot code copy, wherein the second memory is accessible by the embedded controller but inaccessible by the processor,
    wherein the embedded controller is to:
        during a period in which the processor is not accessing the first memory, replace the system boot code in the first memory with the system boot code copy from the second memory; and
        during initialization of the embedded controller:
            first attempt to start the computing device by executing a first controller code stored in the second memory; and
            in response to being unable to start the computing device by executing the first controller code, attempt to start the computing device by executing a second controller code stored in the first memory, wherein the system boot code copy in the second memory is a first system boot code copy that is updateable, and wherein the second memory further stores a second system boot code copy that is immutable, the second system boot code copy being in addition to the system boot code and the first system boot code copy.
2. The computing device of claim 1, wherein the embedded controller is to perform the replacing by retrieving the system boot code copy from the second memory, without accessing any device that is external of the computing device.
3. The computing device of claim 1, wherein the system boot code includes a boot block.
4. The computing device of claim 1, wherein the embedded controller is to access policy information to determine whether to allow an update of the system boot code copy in the second memory.
5. The computing device of claim 4, wherein the policy information is stored in the second memory.
6. The computing device of claim 5, wherein the policy information is updateable between a first setting in which the update of the system boot code copy is allowed, and a second setting in which the update of the system boot code copy is disallowed.
7. The computing device of claim 1, wherein the first memory is a first memory device, and the second memory is a second memory device physically separate from the first memory device.
8. A method comprising:
    in a state of a computing device in which a processor of the computing device is not accessing a first memory in the computing device, determining, by an embedded controller in the computing device, whether system boot code from the first memory is compromised, wherein the first memory is accessible by the processor and the embedded controller over a bus; and
    in response to determining that the system boot code is compromised, retrieving, by the embedded controller, a first system boot code copy from a second memory in the computing device to replace the system boot code in the first memory, wherein the second memory is electrically isolated from the bus and is inaccessible by the processor, wherein the first system boot code copy is updateable, and wherein the second memory further stores a second system boot code copy that is immutable, the second system boot code copy being in addition to the system boot code and the first system boot code copy.
9. The method of claim 8, wherein determining whether the system boot code is compromised comprises determining whether a boot block in the first memory is compromised.
10. The method of claim 9, wherein retrieving the first system boot code copy from the second memory comprises retrieving a boot block copy from the second memory to replace the boot block in the first memory.
11. The method of claim 10, wherein the boot block copy from the second memory is part of a Basic Input/Output System (BIOS) code, and wherein the first system boot code copy in the second memory further includes a remaining portion of the BIOS code.
12. The method of claim 8, wherein determining whether the system boot code in the first memory is compromised is performed by the embedded controller prior to each instance of the processor restarting execution of the system boot code.
13. The method of claim 8, further comprising:
    during an initialization procedure of the embedded controller, verifying controller code; and
    in response to verifying the controller code, loading the controller code into the embedded controller for execution by the embedded controller, wherein the determining and retrieving are performed by the controller code executing in the embedded controller.

14. The method of claim 8, wherein the embedded controller is physically separate from the processor.

15. An article comprising a non-transitory machine-readable storage medium storing instructions that upon execution by an embedded controller in a computing device cause the embedded controller to:

in a state of the computing device in which a processor of the computing device is disabled, determine whether a boot block from a first memory in the computing device is compromised, wherein the first memory is accessible by the processor and the embedded controller over a bus;

in response to determining that the boot block is compromised, retrieve a boot block from a second memory in the computing device to replace the boot block in the first memory, wherein the second memory is electrically isolated from the bus and is inaccessible by the processor; and during initialization of the embedded controller:

first attempt to start the computing device by executing a first controller code stored in the second memory; and in response to being unable to start the computing device by executing the first controller code, attempt to start the computing device by executing a second controller code stored in the first memory, wherein the boot block from the second memory is a first system boot code copy that is updateable, and wherein the second memory further stores a second system boot code copy that is immutable, the second system boot code copy being in addition to a first system boot code and the first system boot code copy.

16. The computing device of claim 1, wherein the processor is physically separate from the embedded controller.

17. The article of claim 15, wherein the embedded controller is physically separate from the processor.

* * * * *